United States Patent [19]

Cox

[11] 4,015,739
[45] Apr. 5, 1977

[54] HAY BALE HANDLING MACHINE

[76] Inventor: Randal A. Cox, R.R. 1, Van Wert, Iowa 50262

[22] Filed: Oct. 23, 1974

[21] Appl. No.: 517,434

[52] U.S. Cl. .......................... 214/766; 214/130 C; 214/DIG. 4

[51] Int. Cl.² .......................................... E02F 3/62

[58] Field of Search ................ 214/130 C, 766, 78, 214/144, 501, 350, 352, DIG. 3, DIG. 4, 77 R, 130 R, 654, 750, 384; 56/DIG. 9

[56] References Cited

UNITED STATES PATENTS

| | | | |
|---|---|---|---|
| 2,254,923 | 9/1941 | Wickett | 214/144 |
| 2,731,161 | 1/1956 | Carstens | 214/766 |
| 3,004,677 | 10/1961 | Reynolds | 214/766 |
| 3,184,082 | 5/1965 | Hall | 214/77 R |
| 3,282,452 | 11/1966 | Parsen | 214/138 |
| 3,674,161 | 7/1972 | Grinde | 214/130 R |
| 3,690,492 | 9/1972 | Shore | 214/DIG. 3 |
| 3,705,658 | 12/1972 | Harris | 214/DIG. 3 |
| 3,762,590 | 10/1973 | Grooss | 214/130 C |
| 3,820,673 | 6/1974 | McVaugh | 214/77 R |
| 3,876,090 | 4/1975 | Holland | 214/766 |

Primary Examiner—L. J. Paperner
Assistant Examiner—Ross Weaver
Attorney, Agent, or Firm—Zarley, McKee, Thomte & Voorhees

[57] ABSTRACT

An elongated finger-support member may be pivotally connected to the three-point hitch of a tractor or to the bed of a pickup truck. The support finger is T-shaped in cross section and tapers to a point and includes a rearwardly facing hook on the top convex surface which supports the baled hay along its axial center. A cross member is provided at the base of the finger for limiting penetration and supporting the baled hay when the finger is in a vertical position. When the support finger is carried on a truck a frame is bolted to the truck bed and includes a cage extending over the hydraulic power cylinder and the cage functions as a stop for limiting the pivotal movement of the finger and further protects the cylinder from the hay. The machine is positioned between the wheel wells of the truck such that the hay is sandwiched therebetween when being transported.

18 Claims, 11 Drawing Figures

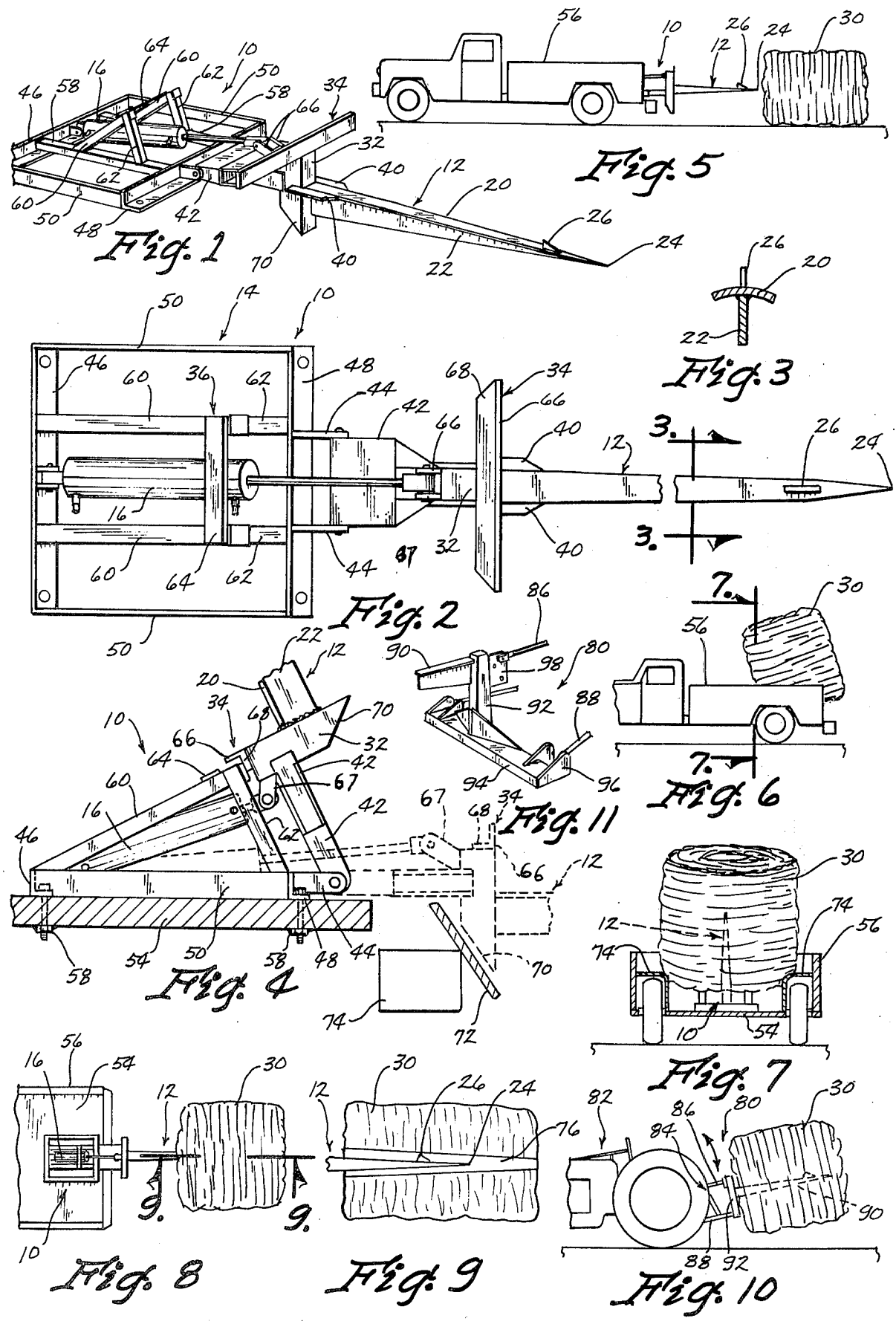

HAY BALE HANDLING MACHINE

The handling of hay through the use of 2,000 to 3,000 pound bales 6 feet in diameter and 5 to 7 feet long presents problems of moving individual bales about for feeding purposes.

The hay handling machine of this invention contemplates a hay handling machine that may be quickly attached to the three-point hitch of a tractor or to the bed of a pickup truck wherein a finger is pivotal from a rearwardly extending horizontal position to an upwardly and forwardly extending position. The bale will be loaded onto the support member by backing the tractor or truck towards the bale with the support finger penetrating the bale along its axial center and then pivoting the support member upwardly for transport. The bale will be held on the support finger by a hook on the top convex load surface. When unloading occurs it can be quickly accomplished due to the fact that the finger is T-shaped and tapers to a point such that a slot is formed in the bale along its axial center and once the hook is released from the hay it will slide readily through the slot formed by the finger.

The hay handling machine mounted in the truck is operated by a hydraulic cylinder positioned in a cage which functions as a stop for limiting pivotal movement of the support finger. In the transport position the support finger is pivoted forwardly and upwardly past the over-center vertical position thus positively maintaining the baled hay in a stationary transport position in the truck box where it is centrally located between the wheel wells which held to stabalize and support the baled hay. A minimum of stress is placed on the finger due to the fact that the load is substantially vertical and the finger is assisted by the cage against which the finger bears to stabilize it. When the bale of hay is to be unloaded it is only necessary to operate the power cylinder to move the finger to the horizontal rearwardly extending position wherein the baled hay is placed on the ground and the truck is free to drive away leaving the bale behind.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the hay handling machine for use in a pickup truck.

FIG. 2 is a top plan view thereof.

FIG. 3 is a cross sectional view taken along line 3 — 3 in FIG. 2.

FIG. 4 is a fragmentary side elevation view showing the support finger in raised and lowered positions.

FIG. 5 is a reduced in scale side elevation view of the hay handling machine in a pickup truck ready to load a bale of hay onto the finger.

FIG. 6 is a view similar to FIG. 5 showing the bale of hay in the loaded transport position inside the truck box.

FIG. 7 is a cross sectional view taken along line 7 — 7 in FIG. 6.

FIG. 8 is a top plan view reduced in scale showing the bale of hay being removed from the finger.

FIG. 9 is a cross sectional view taken along line 9 — 9 in FIG. 8 and showing the enlarged tapered slot in which the hook on the finger is free to move when the bale is being removed from the finger.

FIG. 10 is a reduced in scale side elevation fragmentary view of hay handling machine mounted on the three-point hitch of a tractor and showing the finger in a transport position.

FIG. 11 is a fragmentary perspective view of the hay handling machine only for use on the tractor.

The hay handling machine of this invention for use on pickup trucks is referred to generally in FIG. 1 by the reference numeral 10 and is provided with an elongated finger support member 12 pivotally connected to a frame assembly 14 including a hydraulic cylinder 16 for pivotally moving the finger from a lowered position to a raised position as seen in FIG. 4.

The finger support member 12 is T-shaped in cross section and includes a cross portion 20 having an upper convex support surface integrally connected to a leg 22 of plate material both of which taper to a point 24. A rearwardly facing hook 26 is provided on the convex surface 20 adjacent the point 24 for locking the bale 30 on the support member. A post 32 extends from the base of the support member to a cross member 34 which functions as a stop for the baled hay and limits the pivoting action of the support member by engagement with a cage 36 over the hydraulic cylinder 16.

The support finger 12 is strengthened by gusset plates 40 on the sides of the cross portion 20 extending rearwardly into engagement with the sides of the posts 32. A tongue portion 42 extends rearwardly off of the post 32 for pivotal connection to clevis plates 44 extending rearwardly off of the base frame assembly 14. The base frame assembly includes forward and rearward angle iron members 46 and 48 interconnected by side members 50. Bolts 52 are provided for securing the base frame assembly to the floor 54 of the pickup truck 56. Nuts 58 may be permanently secured to the bottom side of the floor 54 for engagement with the bolts 52 as seen in FIG. 4.

The cage 36 includes longitudinally extending members 58 running from the forward frame member 46 to the rearward frame member 48 on opposite sides of the power cylinder 16. A pair of upwardly and rearwardly extending members 60 are provided on the members 58 and interconnect upwardly and rearwardly extending members 62 secured to the members 58. A cross member 64 interconnects the members 60 adjacent the member 62.

The cross member 34 is L-shaped and includes legs 66 and 68 with the leg 66 extending over the top edges of the cage members 60 while the leg 68 extends over the top edge of the cage member 62 as seen in FIG. 4 thus providing a positive engagement with the cage assembly to limit the pivotal movement of the support member 12 and also prevent hay material from gaining access between the cage and the support member.

A pair of ears 67 are provided on the post 32 above the tongue member 42 for pivotal connection to the power cylinder 16 as best seen in FIG. 4.

The lower end of the post 32 is tapered at 70 to provide a surface that will matingly engage the lowered tailgate 72 resting against the truck bumper 74 as seen in FIG. 4, thereby allowing the support member 12 to pivot as low as possible and necessary.

In operation it is seen that the truck 56 is driven to the location of the bale 30 as seen in FIG. 5, and the elongated finger support member 12 is pivoted to a rearwardly horizontally extending position where the pointed end 24 is on the axial center of the bale of hay 30. The truck then is backed further towards the bale of hay 30 allowing the finger 12 to penetrate the bale of hay until it engages the stop cross member 34 whereupon the hydraulic cylinder 16 is operated to pivot the support member 12 upwardly and forwardly to the position of FIG. 4 where the bale of hay is positioned in the truck box. The lower end of the bale of hay, as seen in FIG. 7, supportingly engages the wheel well 74. When it is desired to unload the bale of hay the power cylinder 16 is operated to lower the support member to the position of FIG. 5 with the bale of hay engaging the ground the truck may be driven off. The hook 26 will offer an initial resistance and once it is overcome the bale will move freely off of the support member 12 since the support member formed an elongated tapered slot 76 in the bale of hay as seen in FIG. 9. With the bale of hay 30 in the transport position of FIG. 6 the bale of hay may be readily transported for long distances since the bale is restricted against movement and the load is distributed appropriately for travel purposes.

An alternate embodiment of the hay bale handling machine of this invention is seen in FIG. 10 and is referred to by the reference numeral 80 wherein it is mounted on a tractor 82 to carry a bale of hay 30. A conventional three-point hitch assembly 84 is provided on the rear of the tractor and includes a top support arm 86 and a pair of lower spaced apart arms 88. The support finger member 90 is connected to a post 92 in turn connected at its lower end to a cross member 94 having oppositely disposed clevises 96 for connection to the three-point hitch support arms 88. A clevis 98 is provided on the opposite side of the post from the support member 90 for connection to the top stabilizer arm 86 of the three-point hitch. The bale of hay 30 may be raised and lowered and is shown in the raised position in FIG. 10. Removal of the bale of hay from the support member 90 is the same as with the truck 56. The hook 26 keeps the bale of hay on the support member 90 for transport purposes even though the support member is not raised to the position of FIG. 6 when the truck is employed. The support member does extend rearwardly and upwardly in the position of FIG. 10.

I claim:

1. A pickup truck mounted round bale handling machine comprising,
    a pickup truck having a frame and a cab and a rearwardly disposed box on said frame including opposite sidewalls, a front end wall, a bed, and an open rear end,
    a round bale hay handling machine having a base frame operatively secured to said truck frame at the rear open end of said box,
    a single elongated hay support finger member pivoted at one end to said base frame and being pointed at the other end for penetrating a bale of hay along its center longitudinal axis and supporting the bale along the length of said support finger and said support finger being positioned on the longitudinal centerline axie of said truck bed, and
    power means connected to said hay support finger for pivoting it between raised and lowered positions with said finger extending rearwardly in said lowered position and adapted to penetrate a hay bale upon said truck moving rearwardly, and extending upwardly above said truck bed in said raised position for transport of a hay bale positioned between the opposite sidewalls of said truck box.

2. The structure of claim 1 wherein said power means includes a hydraulic cylinder extending between the bed of said truck and the support member.

3. The structure of claim 1 wherein said support member includes a cross member at the inner end thereof for limiting the penetration of said support member into said bale of hay.

4. The structure of claim 4 wherein a cage is provided over said support member and in the path of said hydraulic cylinder to limit pivotal movement thereof forwardly and downwardly.

5. The structure of claim 4 wherein said support member includes a cross member at the inner end thereof for limiting the penetration of said support member into said bale of hay, and said cross member positioned to engage said cage to limit pivotal movement of said support member.

6. The structure of claim 5 wherein said cross arm on said support member is L-shaped in cross section and one leg is adapted to overlap the adjacent abutting edge of said cage.

7. The structure of claim 6 wherein said cage is further defined as including a pair of members straddling said hydraulic cylinder extending rearwardly and upwardly which are connected, at their upper ends, to a pair of members extending downwardly and rearwardly and said cross member on said support member is adapted to engage said last mentioned pair of members.

8. The structure of claim 1 wherein said truck includes upstanding wheel wells on the floor bed which are positioned relative to said support finger such that when said support finger is in said raised position extending forwardly and upwardly with a bale of hay thereon said hay engages and is partially supported by said wheel wells.

9. A rolled up carpet type baled hay handling machine comprising,
    a base frame,
    an elongated finger-support member pivoted at one end to said base frame and being pointed at the other end for penetrating a bale of hay along its center longitudinal axis,
    power means connected to said finger-support member for pivoting it between raised and lowered positions,
    said base frame being positioned on the floor of the bed of a truck with said finger extending rearwardly in said lowered position and upwardly and forwardly in said raised position,
    said power means including a hydraulic cylinder extending between the bed of said truck and the support member,
    a cage being provided over said hydraulic cylinder and in the path of said finger-support member to limit pivotal movement thereof forwardly and downwardly, said support member including a cross member at the inner end thereof for limiting the penetration of said support member into said bale of hay, and said cross member being positioned to engage said cage to limit pivotal movement of said support member, and said cross arm on said support member being L-shaped in cross section and one leg being adapted to overlap the adjacent abutting edge of said cage.

10. A rolled up carpet type baled hay handling machine for attachment to a tractor comprising, a base frame, an elongated finger-support member connected at one end to said base frame and being pointed at the other end and having a substantially smooth exterior surface from the pointed end inwardly for penetrating a bale of hay along its center longitudinal axis and carrying said bale along the length of said finger support member, said elongated finger-support member connected to said base frame, said base frame including an upstanding post connected at its bottom end to the middle section of a cross member with the rearward side of the upper end of the post being connected to the inner end of said support member, and pivotal connecting means being provided on the forward side of said post and the forward side of the outer ends of said cross member for pivotally connecting said machine to a three-point tractor hitch for raising and lowering said finger support member and pivoting said support member about an axis extending longitudinally through said pivotal connecting means on said cross member whereby a hay bale is pulled directly into a tractor as said finger is pivoted upwardly and forwardly.

11. A rolled up carpet type baled hay handling machine comprising, a base frame, a single elongated finger-support member pivoted at one end to said base frame and being pointed at the other end for penetrating a bale of hay along its center longitudinal axis, said elongated finger-support member being T-shaped in transverse cross section and the outside surface of the cross of the T being convex upwardly to conform to the curvature of the rolled up carpet of hay in said bale and providing a supporting surface for the bale of hay, said support member decreasing in transverse cross sectional area towards the outer pointed end, an inwardly facing hook on said convex surface at the outer end of said support member whereby a tapered passageway is formed in said bale upon said support member being inserted into said bale and said hook engaging and retaining said hay on said support member until the bale is moved substantially outwardly relative to said hook to release the hay therefrom and allow the bale to move freely along said support member when said bale is being removed from said support member, and power means connected to said finger-support member for pivoting it between raised and lowered positions.

12. The structure of claim 9 wherein said cage is further defined as including a pair of members straddling said hydraulic cylinder extending rearwardly and upwardly which are connected, at their upper ends, to a pair of members extending downwardly and rearwardly and said cross member on said support member is adapted to engage said last mentioned pair of members.

13. A rolled up carpet type baled hay handling machine for attachment to a vehicle comprising, a base frame, a single elongated finger-support member pivoted at one end to said base frame and being pointed at the other end for penetrating a bale of hay along its center longitudinal axis, said elongated finger-support member being T-shaped in transverse cross section and the outside surface of the cross of the T providing a supporting surface for the bale of hay, said support member decreasing in transverse cross sectional area towards the outer pointed end, an inwardly facing hook on said outside supporting surface at the outer end of said support member whereby a tapered passageway is formed in said bale upon said support member being inserted into said bale and said hook engaging and retaining said hay on said support member until the bale is moved substantially outwardly relative to said hook to release the hay therefrom and allow the bale to move freely along said support member when said bale is being removed from said support member, and power means connected to said finger-support member for pivoting it between raised and lowered positions whereby said bale may be lifted and carried by a vehicle.

14. The structure of claim 13 wherein the outside surface of the cross includes oppositely disposed surfaces which slope outwardly and downwardly towards the base of the finger support member.

15. A rolled up carpet type baled hay handling machine for attachment to a vehicle comprising, a base frame, a single elongated finger-support member pivoted at one end to said base frame and being pointed at the other end for penetrating a bale of hay along its center longitudinal axis, said elongated finger-support member is elongated in transverse cross section and includes a top support surface substantially wider than the width of the oppositely disposed bottom surface and said top surface providing a supporting surface for the bale of hay, said support member decreasing in transverse cross sectional area towards the outer pointed end, an inwardly facing hook on said top support surface at the outer end of said support member whereby a tapered passageway is formed in said bale upon said support member being inserted into said bale and said hook engaging and retaining said hay on said support member until the bale is moved substantially outwardly relative to said hook to release the hay therefrom and allow the bale to move freely along said support member when said bale is being removed from said support member, and power means connected to said finger-support member for pivoting it between raised and lowered positions whereby said bale may be lifted and carried by a vehicle.

16. A rolled up carpet type baled hay handling machine for attachment to a vehicle comprising, a base frame, a single elongated finger-support member pivoted at one end to said base frame and being pointed at the other end for penetrating a bale of hay along its center longitudinal axis, said elongated finger-support member being elongated in transverse cross section and including a top support surface substantially wider than the width of the oppositely disposed bottom surface and said top surface providing a supporting surface for the bale of hay, said support member decreasing in transverse cross sectional area towards the outer pointed end whereby a tapered passageway is formed in said bale upon said support member being driven into said bale and wedged thereon and retaining said hay thereon until the bale is moved substantially outwardly along said support member to release the hay therefrom and allow the bale to move freely along said support member when said bale is being removed from said support member, and power means connected to said finger-support member for pivoting it between raised and lowered positions whereby said bale may be lifted and carried by a vehicle.

17. A rolled up carpet type baled hay handling machine comprising, a truck having a bed, a base frame positioned on the floor of the bed of said truck, elongated finger-support member pivoted at one end to said base frame and being pointed at the other end for penetrating a bale of hay along its center longitudinal axis, a hydraulic cylinder extending between the bed of said truck and said finger-support member for pivoting it between raised and lowered positions with said finger extending rearwardly in said lowered position and upwardly in said raised position, and a cage being provided over said hydraulic cylinder and in the path of said support member to limit pivotal movement thereof forwardly and downwardly, said support member including a cross member at the inner end thereof for limiting the penetration of said support member into said bale of hay, and said cross member being positioned to engage said cage to limit pivotal movement of said support member, said cross arm on said support member being L-shaped in cross section and one leg being adapted to overlap the adjacent abutting edge of said cage.

18. A pickup truck mounted round bale handling machine for transporting round bales in an upright position comprising, a pickup truck having a frame and a cab and a rearwardly disposed box on said frame including opposite sidewalls, a front end wall, a bed, and an open rear end, a round bale hay handling machine having a base frame operatively secured to said truck frame at the rear open end of said box, an elongated hay support finger member pivoted at one end to said base frame and being pointed at the other end for penetrating a bale of hay and supporting the bale along the length of said support finger and said support finger having an axis parallel to the longitudinal centerline axis of said truck bed and the support finger including a bale end support means, and power means connected to said hay support finger for pivoting it between raised and lowered positions with said finger extending substantially horizontally rearwardly in said lowered position and adapted to penetrate one end of a hay bale upon said truck moving rearwardly, and extending upwardly above said truck bed in said raised position for transport of a hay bale positioned between the opposite sidewalls of said truck box and with the bale pivoted substantially 90° to a position with its center axis extending substantially vertically and said bale being maintained on said finger support member by its weight being substantially carried by said bale and support means on said one end of said support finger.

* * * * *